United States Patent
Cho et al.

(10) Patent No.: US 9,737,876 B2
(45) Date of Patent: Aug. 22, 2017

(54) CARRIER FOR DRY ADSORBENT FOR CARBON DIOXIDE INCLUDING SPHERICAL SILICA WHOSE SURFACE IS ENGRAVED IN THE FORM OF NANOWIRES AND METHOD FOR PREPARING THE SAME

(71) Applicant: INDUSTRY-ACADEMIC COOPERATION FOUNDATION, YONSEI UNIVERSITY, Seoul (KR)

(72) Inventors: Hyung Hee Cho, Seoul (KR); Hokyu Moon, Seodaemun-gu (KR); Geehong Choi, Incheon (KR); Beom Seok Kim, Seoul (KR); Donghwi Lee, Incheon (KR); Hwanseong Lee, Seoul (KR); Hoanju Yoo, Seoul (KR); Dong Il Shim, Incheon (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 14/945,127

(22) Filed: Nov. 18, 2015

(65) Prior Publication Data

US 2016/0136615 A1    May 19, 2016

(30) Foreign Application Priority Data

Nov. 19, 2014    (KR) .................. 10-2014-0161306

(51) Int. Cl.
*B01J 21/08*    (2006.01)
*B01J 20/10*    (2006.01)
(Continued)

(52) U.S. Cl.
CPC ............. *B01J 21/08* (2013.01); *B01J 20/103* (2013.01); *B01J 20/3204* (2013.01);
(Continued)

(58) Field of Classification Search
CPC .... B01J 21/08; B01J 20/3236; B01J 20/3293; B01J 20/3204; B01J 20/103; B01J 37/06; B01J 37/12; B01J 35/08; Y02C 10/08
See application file for complete search history.

(56) References Cited

U.S. PATENT DOCUMENTS

| | | | |
|---|---|---|---|
| 2010/0178565 A1* | 7/2010 | Green ................ | H01M 4/0492 429/231.95 |
| 2013/0122717 A1* | 5/2013 | Green .................... | C09K 13/08 438/753 |
| 2015/0050556 A1* | 2/2015 | Liu ........................ | C09K 13/08 429/218.1 |

* cited by examiner

*Primary Examiner* — Anthony J Zimmer
(74) *Attorney, Agent, or Firm* — Duane Morris LLP; George M. Lefkowitz; Jason M. Nolan

(57) ABSTRACT

Provided are a carrier for a dry adsorbent for carbon dioxide, including spherical silica whose surface is engraved in the form of nanowires, and a method for preparing the same. Although the carrier for a dry adsorbent for carbon dioxide including spherical silica that has nanowires on the surface thereof has a very non-uniform shape, it serves better as a host structure adsorbing carbon dioxide as compared to the conventional carrier for a carbon dioxide adsorbent, and thus may be used for a host-guest adsorbent applicable to a fluidized bed process. In addition, the method for preparing a carrier for a carbon dioxide adsorbent provides nanowire-coated silicon spheres having an increased surface roughness and an increased surface area, thereby providing increased carbon dioxide capturing efficiency. Further, since the method for forming nanowires is simple, it is easy to carry out mass production without any separate process, thereby providing excellent cost efficiency.

8 Claims, 2 Drawing Sheets

(51) Int. Cl.
  *B01J 20/32* (2006.01)
  *B01J 35/08* (2006.01)
  *B01J 37/12* (2006.01)
  *B01J 37/06* (2006.01)
(52) U.S. Cl.
  CPC ....... *B01J 20/3236* (2013.01); *B01J 20/3293* (2013.01); *B01J 35/08* (2013.01); *B01J 37/06* (2013.01); *B01J 37/12* (2013.01); *Y02C 10/08* (2013.01)

CARRIER FOR DRY ADSORBENT FOR CARBON DIOXIDE INCLUDING SPHERICAL SILICA WHOSE SURFACE IS ENGRAVED IN THE FORM OF NANOWIRES AND METHOD FOR PREPARING THE SAME

CROSS-REFERENCE TO RELATED APPLICATIONS

This application claims priority under 35 U.S.C. §119 to Korean Patent Application No. 10-2014-0161306 filed on Nov. 19, 2014 in the Korean Intellectual Property Office, the disclosure of which is incorporated herein by reference in its entirety.

TECHNICAL FIELD

The following disclosure relates to a carrier for a dry adsorbent for carbon dioxide whose surface is engraved in the form of nanowires, and a method for preparing the same.

BACKGROUND

Recently, as importance of environment has increased, regulation of carbon dioxide in the air has become strict significantly in domestic and foreign countries. Particularly, since the Kyoto Protocol comes into effect, there has been a worldwide tendency to make an effort to reduce the generation of carbon dioxide which has the longest air retention time, the highest contribution to the greenhouse effect and the largest total emission in Korea and to treat the generated carbon dioxide. Thus, there is a need for an active response to such regulation for the purpose of survival of various domestic industries.

First of all, reduction of carbon dioxide, a typical greenhouse gas (particularly in power plants), is imminent. It is thought that the only technology responding to greenhouse gas to reduce directly the amount of carbon dioxide emitted continuously in the energy-related field is Carbon Dioxide Capture and Sequestration (CCS). However, it seems that interest and investment into CCS technology responding greenhouse gas are very low all over the world, except the leading countries of advanced technology. Therefore, it is required that global interest is given to CCS and active efforts are provided to technological commercialization of CCS to reduce continuous emission of carbon dioxide significantly.

Meanwhile, CCS is the abbreviation of Carbon Capture & Sequestration or Storage and referred to as a series of methods for capturing carbon dioxide produced by human industrial activities from its source before its emission into the air and storing it deeply into the underground or converting it into the other chemicals.

CCS includes capturing, transport, storage and conversion. To apply CCS in a broad range, it is essential to reduce the cost required for capturing that occupies about ⅔ of the total CCS cost. Workplaces requiring CCS include thermoelectric power plants, steel works or cement plants generating a large amount of carbon dioxide. Among those, the highest carbon dioxide emission source is thermoelectric power plants occupying 30% of the total emission of carbon dioxide.

Methods for capturing carbon dioxide generated from thermoelectric power plants may be divided broadly into pre-combustion capturing, post-combustion capturing, and mid-combustion capturing (oxyfuel combustion, chemical looping combustion).

Dry carbon dioxide capturing technology uses a solid absorbent capable of absorbing carbon dioxide to absorb carbon dioxide at an absorption tower, and sends the absorbent to which carbon dioxide is absorbed to a regeneration tower so that the absorbed carbon dioxide may be regenerated and concentrated. Herein, the absorption tower and regeneration tower use a fluidized bed. The absorbent for carbon dioxide discharges energy upon the absorption of carbon dioxide and absorbs energy upon the regeneration of carbon dioxide. Therefore, during the absorption of carbon dioxide, the absorbent should be cooled to prevent degradation of absorption efficiency caused by an increase in temperature of the absorbent. In addition, during the regeneration of the absorbed carbon dioxide, a great amount of energy is consumed to supply the carbon dioxide regeneration heat, and thus reduction of the regeneration heat is the most important problem to be solved for propagation of CCS. As an ideal absorbent for carbon dioxide is a material having low carbon dioxide absorption heat while showing high carbon dioxide absorptivity.

As currently developed technology, post-combustion capturing technology that includes capturing carbon dioxide contained in exhaust gas after combustion is regarded as the easiest technology applicable to the existing sources generating carbon dioxide. This is a method for separating and recovering carbon dioxide by adsorbing/desorbing carbon dioxide with a wet/dry adsorbent that has been used for the conventional gas separation processes.

Typical dry adsorbents for capturing carbon dioxide include a support (carrier), such as silica, mesoporous solid or carbon fibers, and an amine or polyamine absorbed physically thereto or bound chemically thereto, so that they may be applied to dry capturing processes using a fluidized bed reactor. Among the carriers for such adsorbents, a mesoporous solid allows production of adsorbent structures having a large surface area (in general, the capturing quality of an adsorbent depends on the surface area characteristics of a carrier as its support). However, such mesoporous solids require a large number of processes and times for their preparation, and thus mass production thereof is limited and commercial application thereof is not amenable. In addition, although the other structures, such as silica, are amenable to mass production, they have a relatively small surface area, and thus may provide low capturing efficiency when applied to a dry capturing process. Further, the adsorbents that have been suggested to date may not ensure structural strength sufficient to be applied to a fluidized bed process, and thus have a limitation in operating actual capturing processes.

Under these circumstances, there is a need for developing a carrier for an adsorbent and a method for preparing the same, wherein the carrier is a support for an adsorbent that directly affects the structural strength applicable to a fluidized bed process and the capturing quality of the adsorbent, the carrier and the method satisfying improvement of quality of the carrier and mass production thereof at the same time.

SUMMARY

An embodiment of the present disclosure is directed to providing a carrier for a dry adsorbent for carbon dioxide, including spherical silica whose surface is engraved in the form of nanowires, and a method for preparing the same.

In one aspect, there is provided a carrier for a dry adsorbent for carbon dioxide, including spherical silica whose surface is engraved in multiple numbers.

According to an embodiment, the spherical silica may be engraved in the form of nanowires.

According to another embodiment, the nanowire may have a height of 150-250 μm.

According to still another embodiment, adsorption of carbon dioxide may occur on the surface of the silica engraved in the form of nanowires.

According to yet another embodiment, the carrier for a dry adsorbent for carbon dioxide is a carrier for a host-guest adsorbent applicable to a fluidized bed process.

In another aspect, there is provided a method for preparing a dry adsorbent for carbon dioxide, including the steps of: (1) dipping a spherical carrier into a mixed solution containing an acid, oxidizing agent and silver nitrate to carry out etching of the spherical carrier; and (2) washing the etched spherical carrier obtained from the step (1).

According to an embodiment, the oxidizing agent may be at least one selected from $H_2O_2$, $Fe(NO_3)_3$, $KMnO_4$, $KBrO_3$ and $K_2Cr_2O_7$.

According to another embodiment, the acid in step (1) may be HF, HCl or a mixture thereof.

According to still another embodiment, the acid, oxidizing agent and silver nitrate in step (1) are used at a molar ratio of 4.5-5.5:0.05-0.15:0.001-0.01.

According to still another embodiment, the spherical carrier in step (1) may be dipped in the mixed solution for 100 minutes to 45 hours.

According to yet another embodiment, in step (2), the etched spherical carrier obtained from step (1) may be washed with a mixed solution containing nitric acid or aqueous ammonia:hydrogen peroxide:methanol (mixed at a volumetric ratio of 0.5-1.5:0.5-1.5:3-5).

In still another aspect, there is provided a method for preparing a dry adsorbent for carbon dioxide, including the steps of: (A) dipping a spherical carrier into a first mixed solution containing (i) hydrofluoric acid or hydrochloric acid and (ii) silver nitrate, thereby providing a spherical carrier with silver deposited on the surface; (B) dipping the spherical carrier with silver deposited on the surface into a second mixed solution containing (i) hydrofluoric acid or hydrochloric acid and (ii) an oxidizing agent, thereby etching the spherical carrier; and (C) washing the etched spherical carrier.

In still another aspect, there is provided a dry adsorbent for carbon dioxide, including the carrier for a dry adsorbent for carbon dioxide according to some embodiments of the present disclosure.

The silicon sphere-based carrier for a dry adsorbent obtained as mentioned above has an advantage in that it facilitates formation of a silicon dioxide ($SiO_2$) coating surface essential for coating an adsorbent for carbon dioxide. It is possible to carry out coating of $SiO_2$ onto the surface of a silicon sphere having improved roughness by virtue of nanowire-structured coating through a process, such as chemical vapor deposition, and to apply a thermal oxidation process that allows oxidation of silicon itself while preserving the surface structure. (As disclosed herein, the surface $SiO_2$ coating is essential for attaching an adsorbent. The other carrier structures having little silicon base requires additional deposition, not oxidation of silicon itself, and such additional deposition results in a significant drop in porosity and degradation of quality).

In general, it is known that a material having large and uniform pores is very suitable for a carrier for a carbon dioxide adsorbent. However, although the carrier for a dry adsorbent for carbon dioxide including spherical silica that has nanowires on the surface thereof according to some embodiments of the present disclosure has a very non-uniform shape, it serves better as a host structure adsorbing carbon dioxide as compared to the conventional carrier for a carbon dioxide adsorbent, and thus may be used for a host-guest adsorbent applicable to a fluidized bed process.

In addition, according to the method for preparing a carrier for a carbon dioxide adsorbent disclosed herein, the nanowire-coated silicon spheres have an increased surface roughness and an increased surface area, thereby providing increased carbon dioxide capturing efficiency. Further, since the method for forming nanowires is simple, it is easy to carry out mass production without any separate process, thereby providing excellent cost efficiency.

DETAILED DESCRIPTION OF EMBODIMENTS

The advantages, features and aspects of the present disclosure will become apparent from the following description of the embodiments with reference to the accompanying drawings, which is set forth hereinafter.

In one aspect, there is provided a carrier for a dry adsorbent for carbon dioxide, including spherical silica whose surface is engraved in multiple numbers. This carrier comprises a silicon spherical core, and a silica shell which is etched and engraved.

Figure 1:
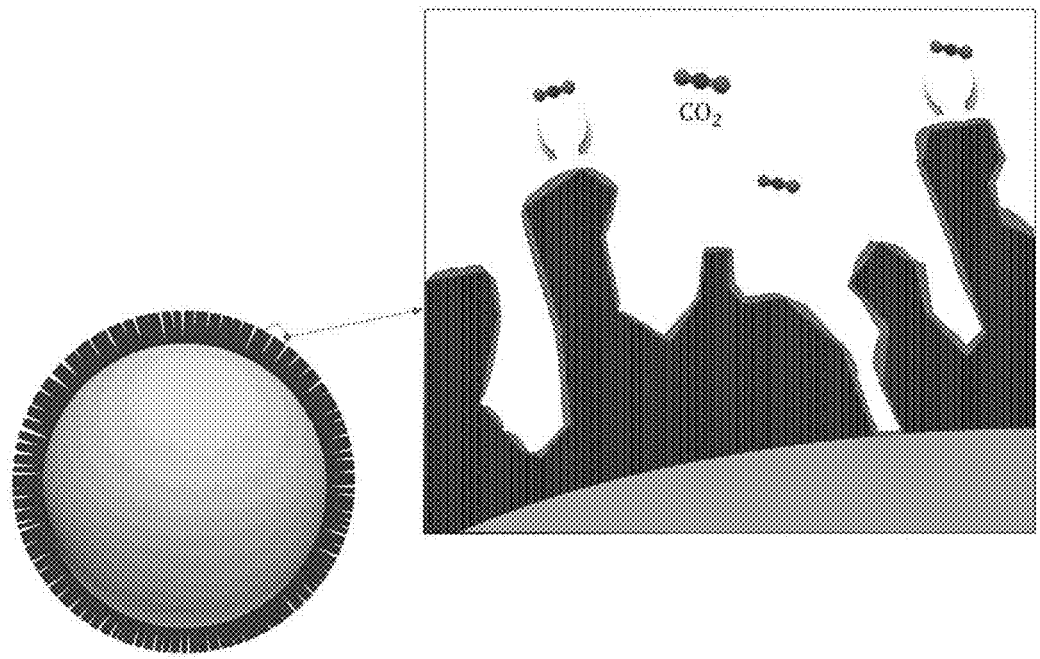
FIG. 1 is a schematic view illustrating the shape of a carrier after forming nanowires to provide a host-guest adsorbent applicable to a fluidized bed process, and a process of absorbing carbon dioxide after coating a guest material, according to an embodiment.
Figure 2:
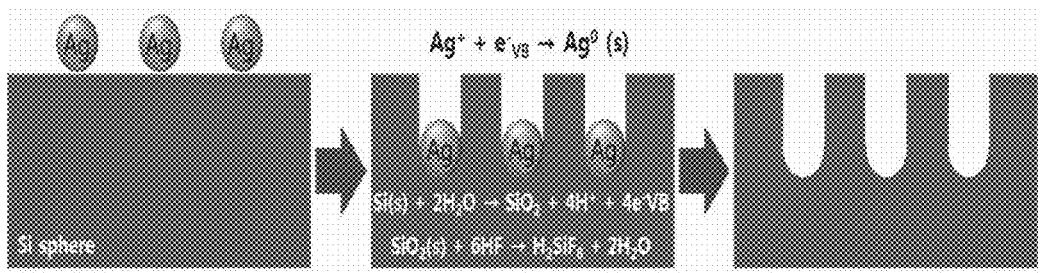
FIG. 2 is a schematic view illustrating a process for preparing a carrier for a dry adsorbent for carbon dioxide according to an embodiment.

It is known that a material having large and uniform pores is very suitable for a carrier for a carbon dioxide adsorbent. However, the carrier for a dry adsorbent for carbon dioxide including spherical silica whose surface is engraved in the form of nanowires according to an embodiment has a very non-uniform shape as shown in FIG. 1, but it is shown that the carrier performs better as a host structure adsorbing carbon dioxide as compared to the conventional carrier for a carbon dioxide adsorbent.

When using silica according to the related art, the silica surface has a smooth surface, has low adsorption efficiency, and thus is not suitable for application to carbon dioxide adsorption. Therefore, it is possible to obtain a desired effect only by modifying the silica surface with a heterogeneous compound (polymer, amine, etc.). On the contrary, according to some embodiments of the present disclosure, it is shown that the silica surface is etched to provide nanowires thereon so that the silica may have an increased surface area, thereby increasing carbon dioxide adsorption efficiency.

According to an embodiment, the spherical silica is engraved in the form of nanowires.

According to an embodiment, the nanowires of the carrier for a dry adsorbent for carbon dioxide has a height of 150-250 μm.

According to an embodiment, the carrier for a dry adsorbent for carbon dioxide is a carrier for a host-guest adsorbent applicable to a fluidized bed process.

In general, carbon dioxide that is an external material may be present in the space that exists in a porous structure. In other words, carbon dioxide may be adsorbed into a material having a porous structure. Herein, unlike zeolite that is an inorganic material having a uniform pore size, the carrier for a dry adsorbent for carbon dioxide disclosed herein has pores variable in size depending on pressure of external carbon dioxide like taking a breath, thereby providing an adsorption isothermal curve that shows a hysteretic behavior. Thus, the carrier may function as a host structure adsorbing carbon dioxide.

In another aspect, there is provided a method for preparing a carrier for a dry adsorbent for carbon dioxide, including the steps of:

(1) dipping a spherical carrier into a mixed solution containing an acid, an oxidizing agent and a silver nitrate, thereby etching the spherical carrier; and (2) washing the etched spherical carrier obtained from the step (1).

According to an embodiment, the nanowire-formed silicon sphere obtained as described above has increased surface roughness and increased surface area, thereby providing increased carbon dioxide capturing efficiency. In addition, the method for forming nanowire structures is easy sufficient to allow mass production, thereby providing excellent cost efficiency. The method merely includes dipping a spherical carrier into a solution for forming nanowires, and thus allows mass production without any separate process.

When dipping the silicon spheres into a solution containing hydrofluoric acid, hydrogen peroxide, silver nitrate, or the like, the oxide ($SiO_2$) film formed on the silicon surface reacts with hydrofluoric acid (HF) and is dissolved in the form of $H_2SiF_6$. The electrons generated during this process precipitate in the form of silver particles through the oxidation with silver ions. After such an etching process, the silver particles are removed from the silicon surface by using nitric acid ($HNO_3$) solution. Then, it is possible to obtain a spherical nanostructural surface etched along the silver ions infiltrating into the surface.

The obtained silicon spherical carrier is converted into a silica ($SiO_2$) carrier through a simple process (oxidation using a furnace) so that it may be applied to a dry capturing process. According to the present disclosure, the method for preparing a carrier for dry adsorption for carbon dioxide merely includes dipping silicon spheres into a solution, and thus allows mass production.

According to an embodiment, the oxidizing agent is at least one selected from $H_2O_2$, $Fe(NO_3)_3$, $KMnO_4$, $KBrO_3$ and $K_2Cr_2O_7$.

According to another embodiment, the acid in step (1) is HF, HCl or a mixture thereof.

According to still another embodiment, the acid, oxidizing agent and silver nitrate in step (1) are used at a molar ratio of 4.5-5.5:0.05-0.15:0.001-0.01.

According to still another embodiment, the spherical carrier in step (1) is dipped in the mixed solution for 100 minutes to 45 hours.

According to yet another embodiment, in step (2), the etched spherical carrier obtained from step (1) is washed with a mixed solution containing nitric acid or aqueous ammonia:hydrogen peroxide:methanol (mixed at a volumetric ratio of 0.5-1.5:0.5-1.5:3-5).

In still another aspect, there is provided a method for preparing a dry adsorbent for carbon dioxide, comprising the steps of:

(A) dipping a spherical silicon carrier into a first mixed solution containing (i) a first acid selected from HF, HCl or a mixture thereof and (ii) silver nitrate, thereby providing a spherical silicon carrier with silver deposited on the surface, (B) dipping the spherical silicon carrier with silver deposited on the surface into a second mixed solution containing (i) a second acid selected from HF, HCl or a mixture thereof and (ii) an oxidizing agent, thereby providing an etched spherical silicon carrier with a silica shell engraved in multiple numbers, and (C) washing the etched spherical silicon carrier.

When the silver layer is coated on the spherical silicon carrier before the etching and the washing steps, the engraved silica shell with a height of 150 μm or higher may be formed, and the height of the engraved silica shell may be delicately controlled within 150 μm to 200 μm by adjusting the etching time. In contrast, when the etching step is conducted without the silver layer forming step, i.e. the aforementioned steps (1) and (2) are carried out, the engraved silica shell with a height of 100 μm or lower μm may just be formed, thus resulting in drastic decrease in the adsorptivity.

Further, it is important to use HF or HCl in the steps (A) and (B). When forming the nanostructures according to an embodiment, different kind of acid has been used to compare nanostructure formability and surface area morphology. As a result, it is shown that use of sulfuric acid requires a time about 10 times more than the use of the other acids to form structures having a similar height. Thus, in this case, there is a problem that an excessively long time is required to provide a carrier for carbon dioxide adsorption, which is also the case when carriers are prepared according to the conventional process. In addition, the use of hydrogen bromide provides nanostructures having a height of 20-40 μm, and it is difficult to carry out etching to a desired height of nanostructures.

Likewise, the use of other acids than the HF or HCl still provides the problems of relatively long process time and uncontrollability of the height of the nanostructures. Thus, the use of HF or HCl in the steps (A) and (B) is important to achieve the effects of the present invention.

According to an embodiment, the oxidizing agent is at least one selected from hydrogen peroxide ($H_2O_2$), Fe($NO_3$)$_3$, $KMnO_4$, $KBrO_3$ and $K_2Cr_2O_7$.

According to another embodiment, the molar ratio of the HF or HCl:the silver nitrate in the first mixed solution is 4.5-5.5:0.001-0.01; and the molar ratio of the HF or HCl:the oxidizing agent in the second mixed solution is 4.5-5.5:0.05-0.15.

The aforementioned molar ratios are important considering the molar ratios out of the above-defined range may lead to various undesirable results. That is, out of the aforementioned range, nanostructures with the height of around 20 μm may be just formed. Also, the etching reaction cannot be conducted at a substantially constant rate and the thickness of silver deposited on the silica surface is also varied with the lapse of time. As a result, the silicon etching is not sufficient or the etching direction is far from the radial direction or the height of the nanostructures is not uniform.

According to a further embodiment, the step (A) is conducted 40 seconds to 3 minutes.

When the time is out of the range, the amount of deposited silver is excessively low or high, and thus sufficient number of nanostructures with sufficient depth are difficult to be formed, which results in drastic decrease in the adsorptivity of the final adsorbent.

According to a further embodiment, the step (B) is conducted 100 minutes to 45 hours.

The height of the nanostructures depend on the etching time. Especially when the aforementioned first and seconds solution are used (i.e. the first solution with the molar ratio of the HF or HCl:the silver nitrate being 4.5-5.5:0.001-0.01, and the second solution with the molar ratio of the HF or HCl:the oxidizing agent being 4.5-5.5:0.05-0.15), less than 100 minutes for the step (B) leads to the formation of the nanostructures with the height of approximately 20 μm, thus lowering the adsorptivity.

When the aforementioned first and seconds solution are used (i.e. the first solution with the molar ratio of the HF or HCl:the silver nitrate being 4.5-5.5:0.001-0.01, and the second solution with the molar ratio of the HF or HCl:the oxidizing agent being 4.5-5.5:0.05-0.15), higher than 45 hours for the step (B) leads the formation of the nanostructures with the height of higher than 250 μm, thus also unpredictably lowering the adsorptivity by 30% or more compared to the nanostructures having a height of 150-200 μm.

According to still another embodiment, the first acid is HF, and the second acid is a mixture of HF and HCl in a molar ratio of 1:0.9-1.1.

When the first acid is HF and the molar ratio in the second is within the above-defined range, etching may be performed in the direction substantially toward the center of the silicon core (i.e. the nanostructures may be formed in a radial direction), thus being capable of drastically increasing the adsorptivity.

According to still further embodiment, the step (C) is conducted with a third mixed solution containing nitric acid or aqueous ammonia:hydrogen peroxide:methanol (mixed at a volumetric ratio of 0.5-1.5:0.5-1.5:3-5).

Out of the range, adsorbing material cannot be sufficiently fixed on thus prepared nanostructured carrier, thus drastically lowering durability of the adsorbents.

In another aspect, there is provided a dry adsorbent for carbon dioxide comprising a carrier according to various embodiments of the present disclosure.

The examples and experiments will now be described. The following examples and experiments are for illustrative purposes only and not intended to limit the scope of this disclosure. In addition, many modifications can be made by those skilled in the art based on the teachings of the present disclosure without departing from the essential scope thereof, and the present disclosure will include all embodiments falling within the scope of the appended claims.

Example 1

First, silicon spheres are dipped into a mixed solution containing hydrofluoric acid (HF) and silver nitrate at a molar ratio of 4.8:0.005 for 1 minute so that silver is deposited on the silicon surface. Next, the silicon spheres are dipped in a mixed solution containing hydrofluoric acid (HF) and hydrogen peroxide at a molar ratio of 4.8:0.1 for 24 hours, and then the silicon particles are collected. Then, the silicon particles are washed with a washing solution comprising nitric acid ($HNO_3$), hydrogen peroxide, and methanol (volumetric ratio of 0.7:0.1:4) to obtain a carrier for a dry adsorbent for carbon dioxide. Thus formed nanostructures on the silicon surface are confirmed to have an average height of 200 μm.

Example 2

Example 1 is repeated, except the use of the a mixed solution containing hydrofluoric acid (HF) and silver nitrate at a molar ratio of 5.0:0.02 instead of the aforementioned solution containing hydrofluoric acid (HF) and silver nitrate at a molar ratio of 4.8:0.005. Thus formed nanostructures on the silicon surface are confirmed to have an average height of 25 μm. Further, compared to those of the Example 1, the height values of the nanostructures are far much widely distributed, and the deviation of the nanostructures from the radial direction is much higher.

In the meantime, it can be seen from the above result that when a carrier for a dry adsorbent for carbon dioxide is prepared by the above-mentioned process, the silicon particles are continuously exposed to silver nitrate solution and silver particles are also deposited around the etched silicon structures, and thus it is possible to obtain a porous structure having larger openings as compared to Example 1.

Therefore, whereas it is possible to obtain long vertical structures having a nearly uniform length of 200 μm in Example 1, and thus being capable of stably capturing carbon dioxide, the carrier prepared in Example 2 includes nanostructures having non-uniform lengths and direction along with larger openings. In addition, the structures in Example 2 are so distributed on the surface that microconvection may occur efficiently on the surface, thus leading to lowered storage of carbon dioxide.

Example 3

Example 1 is repeated, except that the silicon spheres are dipped for 70 minutes instead of 24 hours. Thus formed nanostructures on the silicon surface are confirmed to have an average height of 23 μm.

Example 4

Example 1 is repeated, except that the silicon spheres are dipped for 48 hours instead of 24 hours. Thus formed nanostructures on the silicon surface are confirmed to have an average height of 257 μm.

Test Example 1: SEM Analysis

Figure 3:
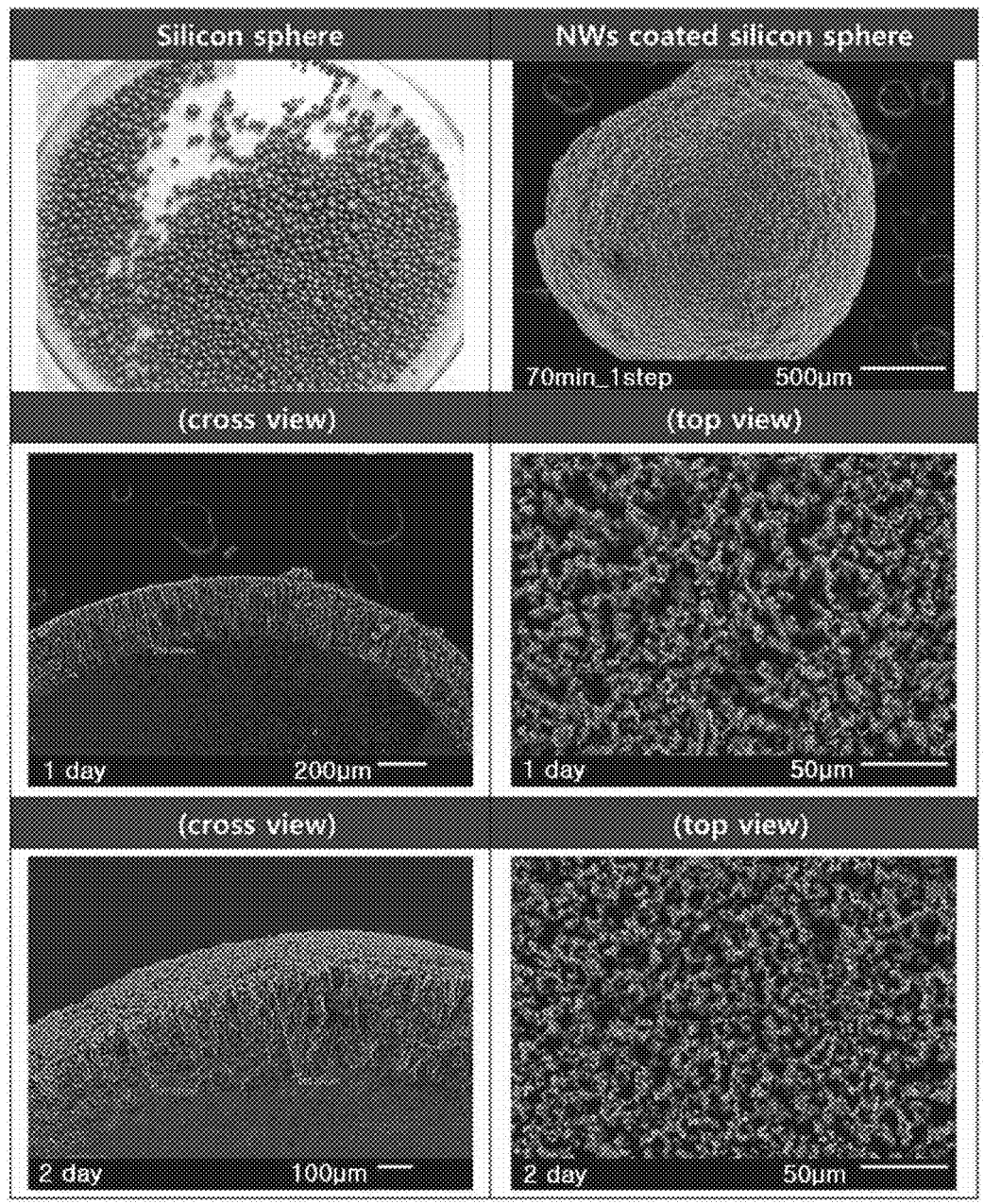
FIG. 3 shows scanning electron microscopic (SEM) images of the silicon spheres and nanowire-coated surfaces according to an embodiment.

The silicon spheres prepared in Example 1 are introduced to an etching solution and determined through scanning electron microscopy (SEM). It can be seen from FIG. 3 that the nanostructures has an average height of 200 μm or more with the lapse of etching time.

Test Example 2: Height-Dependence Behavior of Adsorptivity

After carrying out comparison of carbon dioxide adsorptivity depending on height of the nanostructures according to some embodiments, it is shown that nanostructures having a height of 150-250 μm provide the highest adsorptivity. In addition, it is shown that nanostructures having a height larger than 250 μm actually leads to a drastical drop in carbon dioxide adsorptivity by about at least 30%.

Test Example 3: Comparison of Nanostructure Formability Depending on Acid Type

When preparing nanostructures according to some embodiments, different types of acids are used to carry out comparison in terms of nanostructure formability and surface area. After the comparison, it is shown that use of sulfuric acid requires a time about 10 times more than use of the other acids to form nanostructures having a similar height. Thus, in this case, there is a problem in that an excessively long time is required to provide a carrier for carbon dioxide adsorption, like the preparation of conventional carriers. It is also shown that use of hydrogen bromide provides nanostructures having a height of 20-40 μm, and thus it is difficult to carry out etching to a desired height of nanostructures.

What is claimed is:

1. A method for preparing a carrier for a dry adsorbent for carbon dioxide, comprising the steps of:
    (A) dipping a spherical silicon carrier into a first mixed solution containing (i) a first acid selected from HF, HCl or a mixture thereof and (ii) silver nitrate, for 40 seconds to 3 minutes, thereby providing a spherical silicon carrier with silver deposited on the surface,
    (B) dipping the spherical silicon carrier with silver deposited on the surface into a second mixed solution containing (i) a second acid selected from HF, HCl or a mixture thereof and (ii) an oxidizing agent, thereby providing an etched spherical silicon carrier, and
    (C) washing the etched spherical silicon carrier;
    wherein the first acid is HF, and the second acid is a mixture of HF and HCl in a molar ratio of 1:0.9-1.1, and
    wherein step (C) is conducted with a third mixed solution containing (i) nitric acid, hydrogen peroxide, and methanol in a volumetric ratio of nitric acid, hydrogen peroxide, and methanol of 0.5-1.5:0.5-1.5:3-5; or (ii) aqueous ammonia, hydrogen peroxide, and methanol in a volumetric ratio of aqueous ammonia, hydrogen peroxide, and methanol of 0.5-1.5:0.5-1.5:3-5.

2. The method for preparing a carrier for a dry adsorbent for carbon dioxide according to claim 1, wherein the oxidizing agent is at least one selected from hydrogen peroxide ($H_2O_2$), $Fe(NO_3)_3$, $KMnO_4$, $KBrO_3$ and $K_2Cr_2O_7$.

3. The method for preparing a carrier for a dry adsorbent for carbon dioxide according to claim 1, wherein the molar ratio of the first acid:the silver nitrate in the first mixed solution is 4.5-5.5:0.001-0.01; and
    the molar ratio of the second acid:the oxidizing agent in the second mixed solution is 4.5-5.5:0.05-0.15.

4. The method for preparing a carrier for a dry adsorbent for carbon dioxide according to claim 1, wherein the step (B) is conducted for 100 minutes to 45 hours.

5. A method for preparing a carrier for a dry adsorbent for carbon dioxide, comprising the steps of:
    (A) dipping a spherical silicon carrier into a first mixed solution containing HF and silver nitrate, thereby providing a spherical silicon carrier with silver deposited on the surface,
    (B) dipping the spherical silicon carrier with silver deposited on the surface into a second mixed solution containing a mixture of HF and HCl in a molar ratio of 1:0.9-1.1 and an oxidizing agent, thereby providing an etched spherical silicon carrier, and
    (C) washing the etched spherical silicon carrier; and
    wherein step (C) is conducted with a third mixed solution containing (i) nitric acid, hydrogen peroxide, and methanol in a volumetric ratio of nitric acid, hydrogen peroxide, and methanol of 0.5-1.5:0.5-1.5:3-5; or (ii) aqueous ammonia, hydrogen peroxide, and methanol in a volumetric ratio of aqueous ammonia, hydrogen peroxide, and methanol of 0.5-1.5:0.5-1.5:3-5.

6. The method for preparing a carrier for a dry adsorbent for carbon dioxide according to claim 5, wherein the oxidizing agent is at least one selected from hydrogen peroxide ($H_2O_2$), $Fe(NO_3)_3$, $KMnO_4$, $KBrO_3$ and $K_2Cr_2O_7$.

7. The method for preparing a carrier for a dry adsorbent for carbon dioxide according to claim 5, wherein the molar ratio of the first acid:the silver nitrate in the first mixed solution is 4.5-5.5:0.001-0.01; and
    the molar ratio of the second acid:the oxidizing agent in the second mixed solution is 4.5-5.5:0.05-0.15.

8. The method for preparing a carrier for a dry adsorbent for carbon dioxide according to claim 5, wherein the step (B) is conducted for 100 minutes to 45 hours.

* * * * *